United States Patent
Periyathambi et al.

(10) Patent No.: US 11,436,655 B2
(45) Date of Patent: Sep. 6, 2022

(54) DIFFERENT ACTION USER-INTERFACE COMPONENTS IN A COMPARISON VIEW

(71) Applicant: eBay Inc., San Jose, CA (US)

(72) Inventors: Ramesh Periyathambi, San Ramon, CA (US); Tomer Lancewicki, Jersey City, NJ (US); Sai Vipin Siripurapu, Santa Clara, CA (US); Lakshimi Duraivenkatesh, San Ramon, CA (US); Selcuk Kopru, San Jose, CA (US)

(73) Assignee: eBay Inc., San Jose, CA (US)

( * ) Notice: Subject to any disclaimer, the term of this patent is extended or adjusted under 35 U.S.C. 154(b) by 44 days.

(21) Appl. No.: 16/590,018

(22) Filed: Oct. 1, 2019

(65) Prior Publication Data

US 2021/0097594 A1    Apr. 1, 2021

(51) Int. Cl.
G06Q 30/06    (2012.01)
G06N 20/00    (2019.01)
G06Q 30/08    (2012.01)

(52) U.S. Cl.
CPC ......... *G06Q 30/0629* (2013.01); *G06N 20/00* (2019.01); *G06Q 30/0643* (2013.01); *G06Q 30/08* (2013.01)

(58) Field of Classification Search
CPC ............................................... G06Q 30/06–08
See application file for complete search history.

(56) References Cited

U.S. PATENT DOCUMENTS 8,019,650 B2 *  9/2011  Donsbach ......... G06Q 30/0603
                                                705/26.1
8,401,924 B1 *  3/2013  Rajyaguru ......... G06Q 30/0641
                                                705/26.61

(Continued)

FOREIGN PATENT DOCUMENTS

KR    10-2009-0036024 A    4/2009
KR    10-2013-0013889 A    2/2013
KR    10-2019-0024502 A    3/2019

OTHER PUBLICATIONS

How to Design Better Buttons, Nick Babich, Nov. 9, 2016, available at: https://www.smashingmagazine.com/2016/11/a-quick-guide-for-designing-better-buttons/, (hereafter Babich) (Year: 2016).*

(Continued)

*Primary Examiner* — Ming Shui
(74) *Attorney, Agent, or Firm* — Fig. 1 Patents

(57) ABSTRACT

Different action user-interface components in a comparison view are described. Initially, a selection is received to display a comparison view via a user interface of a listing platform. Multiple listings of the listing platform are selected for inclusion in the comparison view. A comparison view system determines which action of a plurality of actions, used by the listing platform, to associate with each of the listings. A display device displays the multiple listings concurrently in a comparison view via a user interface of the listing platform and also displays an action user-interface component (e.g., a button) in each of the plurality of listings. The action user-interface component is selectable to initiate the action associated with the respective listing. In accordance with the described techniques, the action user-interface component displayed in at least two of the multiple listings is selectable to initiate different actions in relation to the respective listing.

20 Claims, 8 Drawing Sheets

(56) References Cited

U.S. PATENT DOCUMENTS

| | | | |
|---|---|---|---|
| 9,064,277 B2* | 6/2015 | Wong | G06Q 30/06 |
| 2002/0065721 A1 | 5/2002 | Lema et al. | |
| 2004/0015415 A1* | 1/2004 | Cofino | G06Q 30/0611 |
| | | | 705/7.11 |
| 2011/0246881 A1* | 10/2011 | Kushman | G06F 9/453 |
| | | | 715/708 |
| 2012/0159379 A1* | 6/2012 | Negrillo | G06F 3/04842 |
| | | | 715/781 |
| 2015/0193851 A1 | 7/2015 | Hua et al. | |
| 2016/0154862 A1* | 6/2016 | Gabbai | G06Q 30/0241 |
| | | | 707/722 |

OTHER PUBLICATIONS

YITH, "Comparison Table—YITH WooCommerce Compare," Retrieved from Internet URL: https://docs.yithemes.com/yith-woocommerce-compare/category/comparison-table/, Accessed on Dec. 26, 2019, 12 pages.

YITH, "YITH Compare—General Settings," Retrieved from the Internet URL: https://docs.yithemes.com/yith-woocommerce-compare/premium-version-settings/general-settings-2/, Accessed on Dec. 26, 2019, 4 pages.

Office Action Received for Korean Patent Application No. 10-2020-0099207 dated Aug. 27, 2021, 8 pages (1 Page of English Translation & 7 Pages of Official Copy).

* cited by examiner

600

DIFFERENT ACTION USER-INTERFACE COMPONENTS IN A COMPARISON VIEW

BACKGROUND

Service provider systems continue to make advances in computing technologies which enable various listings to be surfaced to client devices. With these advances, a continually increasing number of service providers and associated applications surface listings to client devices for various listed "items." Example items listed by these service providers include products and services such as consumer products (new and used), financial instruments, real property, property rentals, service offerings (e.g., house cleaning, babysitting, landscaping, etc.), classified offerings, and so on. Other examples of listed items may include profiles, such as player profiles in fantasy sports, user profiles in online dating, user profiles in social networking, and so forth. In addition to advances in technologies for surfacing listings, service provider systems also continue to make advances in computing technologies for comparing these listings.

Conventional techniques for comparing these listings typically involve a service provider system selecting a group of multiple listings based on one or more criteria, such as the listings being similar (e.g., to a listing being viewed currently), the listings being included in a list of listings (e.g., a watch or wish list), the listings having been added to an online shopping cart for potential purchase, the listings having been bid on in an online auction, and so forth. These service providers then display the listings in a comparison view, where the listings are often displayed side-by-side (or stacked) with a plurality of attributes such that each listing's information for a given attribute (e.g., price) is adjacent to neighboring listings' information for the given attribute. In a scenario where listings of the comparison view are arranged horizontally, one listing to another, the listings may be considered columns of the comparison view and the attributes may be considered rows of the comparison view. To this extent, users may simply be able to scan and/or scroll left and right across the comparison view to view information for a given attribute, e.g., a user may be able to visually scan the comparison view left to right to compare an image or a price of each listing.

However, conventional systems limit conversion achieved via comparison views. Some comparison views displayed by conventional systems, for instance, display no user interface components (e.g., buttons) that enable users to initiate an action in relation to the comparison view's listings, while other comparison views display a same user interface component (e.g., an "Add to Cart" button) in all of the listings. Because users often leverage comparison views when trying to decide between listings, conventional comparison views fail to take advantage of actual engagement by users with service providers to cause conversion. Indeed, users may analyze a comparison view displayed by one service provider system, but then navigate to a user interface of another service provider system to finalize conversion, e.g., purchase a listed item, initiate contact with a profiled user, and so forth.

SUMMARY

To overcome these problems, different action user-interface components are leveraged in a comparison view. Initially, a selection is received to display a comparison view, e.g., an input is received to navigate to a web page of a particular item listed by a listing platform where the comparison view is to be included as a component of the web page. Multiple listings of the listing platform are selected for inclusion in the comparison view. Once the listings are selected, a comparison view system determines which action of a plurality of actions, available for use in connection with the listing platform, to associate with each of the listings. By way of example, the comparison view system determines the action to associate with each individual listing using a machine learning model, e.g., a reinforcement learning model.

A display device displays the multiple listings concurrently in a comparison view via a user interface of the listing platform. Additionally, the display device displays an action user-interface component (e.g., a button) in each of the plurality of listings that is selectable to initiate the action associated with the respective listing. In accordance with the described techniques, the action user-interface component displayed in at least two of the multiple listings is selectable to initiate different actions in relation to the respective listings. In order to differentiate between different actions initiated, the action user-interface component may, for the different actions, be configured with differing visual characteristics, such as different text (e.g., indicative of the action initiated), colors, and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
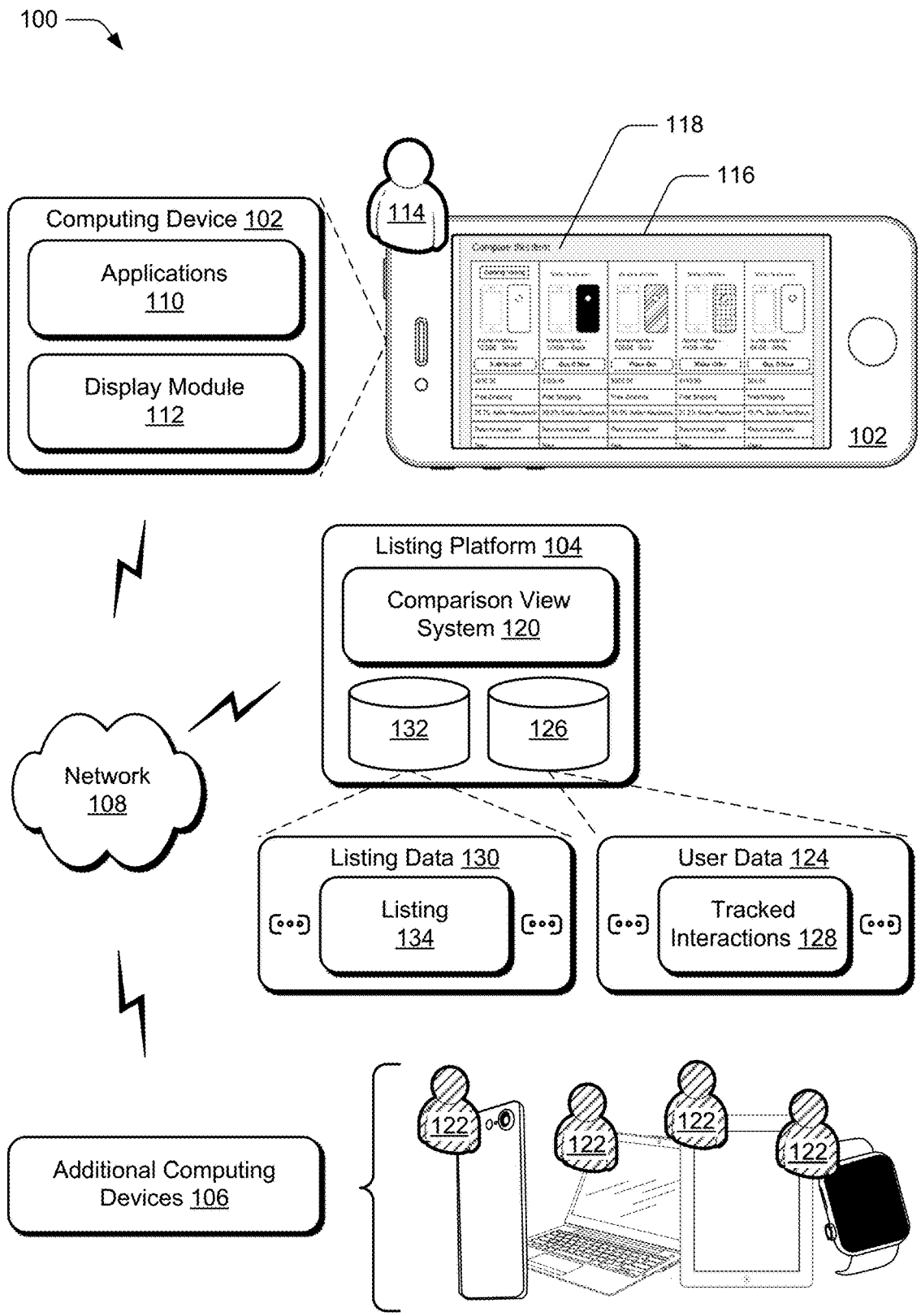
FIG. 1 is an illustration of an environment in an example implementation that is operable to employ techniques described herein.

Service provider systems continue to make advances in computing technologies which enable various listings to be surfaced to client devices. Conventional techniques for comparing these listings typically involve a service provider system selecting a group of multiple listings and displaying the listings in a comparison view, e.g., where the listings are displayed side-by-side (or stacked) with a plurality of attributes. However, conventional systems limit conversion achieved via comparison views. Some comparison views displayed by conventional systems, for instance, display no user interface components (e.g., buttons) that enable users to initiate an action in relation to the comparison view's listings, while other comparison views display a same user interface component (e.g., an "Add to Cart" button) in all of the listings. Because users often leverage comparison views when trying to decide between listings, conventional comparison views fail to take advantage of actual engagement by users with service providers to cause conversion.

To overcome these problems, different action user-interface components are leveraged in a comparison view. Initially, a selection is received to display a comparison view. By way of example, an input is received to navigate to a web page of a particular item listed by a listing platform, where the comparison view is to be included as a component of the web page. Alternately or in addition, a user input may be received specifically to display the comparison view, such as by receiving selections (e.g., via "Select to Compare" user-interface components) to add listings to a list and receiving a selection to view those listings. Responsive to this, a comparison view system determines which listings listed by the listing platform to include in the comparison view. The comparison view system may determine which listings to include based on one or more criteria, such as the listings being similar (e.g., to a listing being viewed currently), the listings being included in a list of listings (e.g., a watch or wish list), the listings having been added to an online shopping cart for potential purchase, the listings having been bid on in an online auction, and so forth.

In contrast to conventional systems—which include no action user-interface component in the listings of a comparison view or include a same action user-interface component (e.g., an "Add to Cart" button) in all listings of a comparison view—the comparison view system determines which action of a plurality of actions, available for use in connection with the listing platform, to associate with each of the listings. In this way, the listings in the described comparison view may include action user-interface components that are selectable to initiate different actions. For instance, the action user interface component in a first listing of the comparison view may be selectable to initiate an "Add to Cart" action while the action user interface component in a second listing of the comparison view is selectable to initiate an "Add to Watch List" action, but not the "Add to Cart" action.

In one or more implementations, the comparison view system determines which available action to associate with a listing of the comparison view using machine learning. By way of example, the comparison view system uses a reinforcement learning model to determine which available action to associate with a listing. By using reinforcement learning, the comparison view system is able to account for a real-time context in which the comparison view is to be displayed. The context describes a variety of aspects relating to the comparison view and at a particular time the comparison view is to be displayed. Among other aspects, for instance, the context describes behavior of a user to which the comparison view is displayed, behavior of other users of the listing system in relation to the listings in the comparison view, and also accounts for behavior changes of the user and the other users over time. Given this, the reinforcement learning model may predict, for a same user, a first set of actions for listings at a first time and a second, different set of actions for those same listings at a second, subsequent time. Similarly, the reinforcement learning model may predict, for a first user, a first set of actions for listings at a particular time and, for a second user, a second, different set of actions for the same listings at the particular time. Use of the reinforcement model enables the comparison view system to determine actions to associate with the listings of a comparison view in a way that optimizes the displayed combinations of action user-interface components for achieving some objective, e.g., increasing a gross amount of money users spend with the listing platform, increasing a number of users converting (e.g., making a purchase or initiating contact with a profiled user) with the listing platform, and so forth.

After the actions are determined for the listings, the comparison view can be displayed. A display module causes a display device to display the multiple listings concurrently in the comparison view via a user interface of the listing platform. The display module also causes the display device to display an action user-interface component (e.g., a button) in each of the plurality of listings that is selectable to initiate the action associated with the respective listing. In accordance with the described techniques, the action user-interface component displayed in at least two of the multiple listings is selectable to initiate different actions in relation to the respective listing. In order to differentiate between different actions initiated, the action user-interface component may, for the different actions, be configured with differing visual characteristics, such as different text (e.g., indicative of the action initiated), colors, and so forth. The comparison view described herein is an improvement over conventional comparison views because there is typically a limited amount of screen space available for each listing in a comparison view—the limited amount of space limiting the listing to a single interface component—and because the ability to display different action user-interface components can take advantage of how users will actually interact with the different listings. Additionally, the ability to display different action user-interface components can cause higher conversion rates toward achieving a goal, such as increasing the listing platform's above-discussed objectives.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ different action user-interface components in a comparison view as described herein. The illustrated environment 100 includes a computing device 102, a listing platform 104, and additional computing devices 106. The computing device 102, the listing platform 104, and the additional computing devices 106 are communicatively coupled, one to another, via a network 108.

Devices that are usable to implement the computing device 102, the listing platform 104, and the additional computing devices 106 may be configured in a variety of ways. A suitable device, for instance, may be configured as a desktop computer, a laptop computer, a mobile device (e.g., assuming a handheld configuration such as a tablet or mobile phone), a wearable device, one or more server devices, and so forth. Thus, suitable devices may range from full resource devices with substantial memory and processor resources (e.g., personal computers, game consoles) to low-resource devices with limited memory and/or processing resources (e.g., wearable devices). Additionally, these devices may be representative of a plurality of different devices, such as multiple servers utilized by a business to perform operations "over the cloud" as further described in relation to FIG. 8.

The computing device 102 is illustrated as including applications 110 and display module 112. The applications 110 represent various computer applications of the computing device 102 which provide a variety of functionality. One example of an application 110 is a browser, which enables a user 114 of the computing device 102 to access information over the network 108 (e.g., the Internet), such as by navigating to webpages provided by various service providers. Other examples of the applications 110 include mobile applications, such as e-commerce applications, fantasy sports applications, financial instrument trading applications, social networking applications, online dating applications, and so forth. It is to be appreciated that the applications 110 may include a variety of computer applications on or otherwise accessible to the computing device 102 without departing from the spirit or scope of the described techniques.

Broadly speaking, the display module 112 causes display of digital visual content via a display device 116 associated with the computing device 102. In the illustrated environment 100, the display device 116 is depicted incorporated within a housing of the computing device 102, however; it is to be appreciated that in various implementations the display device 116 may not be incorporated within a housing of the computing device 102, but instead may be communicably coupled to the computing device 102, such as by a wired or wireless communicable coupling.

In accordance with the described techniques, the display module 112 causes display via the display device 116 of a comparison view 118. As discussed in further detail in relation to FIG. 2, the comparison view 118 includes a plurality of listings, each of the listings includes an action user-interface component (e.g., a button), and the action user-interface components of at least two of the listings are selectable to initiate different actions in relation to the respective listing. For example, one or more of the listings in the comparison view 118 may include an action user-interface component, such as an "Add to Cart" button, and one or more different listings of the comparison view 118 may include a different action user-interface component, such as a "Buy It Now" button, a "Place Bid" button, and so on. This configuration of the comparison view 118 contrasts with conventional techniques which display a same action user-interface component for each listing (e.g., all listings have only an "Add to Cart" button) and also contrasts with conventional techniques which do not display an action user-interface component with any of the listings.

Comparison view system 120 is configured to determine which action user-interface components to include with each listing in the comparison view 118. The comparison view system 120 determines which action user-interface components to include based on data describing behavior the user 114 as well as data describing behavior of other users 122 of the additional computing devices 106. The illustrated environment 100 includes user data 124, which is illustrated as being stored in storage 126 and includes tracked interactions 128. The tracked interactions 128 correspond to data describing interactions of the user 114 and the other users 122 with the listing platform 104, such as interactions with various user interfaces exposed to the user 114 and the other users 122 by the listing platform 104.

These interactions may be tracked by a tracking service (not shown) of the listing platform 104 and describe interactions of users, for instance, with a home page of the listing platform 104, a search component of the listing platform 104, a view item page of the listing platform 104, a checkout page of the listing platform 104, and so forth. Examples of the data that may be collected to track these interactions and produce the tracked interactions 128 include clickstream data, gaze tracking data, voice command data, and so on. Additionally, it is to be appreciated that the tracked interactions 128 may describe interactions of users with one or more homepages (e.g., when the listing platform 104 configures its home page differently in different scenarios), one or more search components (e.g., a search bar on a website, a search bar integrated within a browser, a search initiated with a voice assistant platform, and so on), one or more view item pages (e.g., for different listings), one or more checkout pages for different listings and at different stages of a checkout process, and so forth.

It is also to be appreciated that the tracked interactions 128 may describe interactions of users with the listing platform 104 via multiple different channels, such as interactions with a web site presented via a browser, interactions with a mobile application, interactions to purchase items at a physical store, and so forth. The tracked interactions 128 may describe a variety of interactions of the user 114 and the other users 122 with the listing platform 104 without departing from the spirit and scope of the described techniques. The user data 124 is illustrated with ellipses to indicate that additional data about the user 114 and the other users 122 is stored in the storage 126. This additional data can include user profile data, such as account information, demographics, previous purchase history, and so forth. The user data 124 may include a variety of additional data about the user 114 and the other users 122.

The comparison view system 120 also determines which action user-interface components to include based on data describing the listings that are included in the comparison view 118. The illustrated environment 100 includes listing data 130, which is illustrated as being stored in storage 132 and includes listing 134. The listing data 130 is included with ellipses to indicate that it includes data describing multiple listings 134, e.g., for each listing listed by the listing platform 104. By way of example, the listing data 130 can describe multiple products or services listed as being available for purchase via the listing platform 104. In relation to the comparison view 118, the comparison view system 120 leverages the listings 134 that are selected for the comparison view 118 to further determine which action user-interface component to display with each of the selected listings.

By displaying different action user-interface components for different listings, the comparison view 118 is an improvement over conventionally configured comparison views that display a same action user-interface component with every listing in the views and over comparison views with no action user-interface components. In particular, the comparison view 118 described herein is an improvement because there is typically a limited amount of screen space available for each listing in a comparison view—the limited amount of space limiting the listing to a single interface component—and because the ability to display different action user-interface components can take advantage of how users will interact in relation to different listings. By way of example, the ability to display different action user-interface components can cause higher conversion rates toward achieving a goal, such as increasing a gross amount of money users spend with the listing platform 104, increasing a number of users making purchases with the listing platform 104, and so forth.

Having considered an example environment, consider now a discussion of some example details of the techniques for different action user-interface components in a comparison view in accordance with one or more implementations.

Different Action User-Interface Components in a Comparison View

Figure 2:
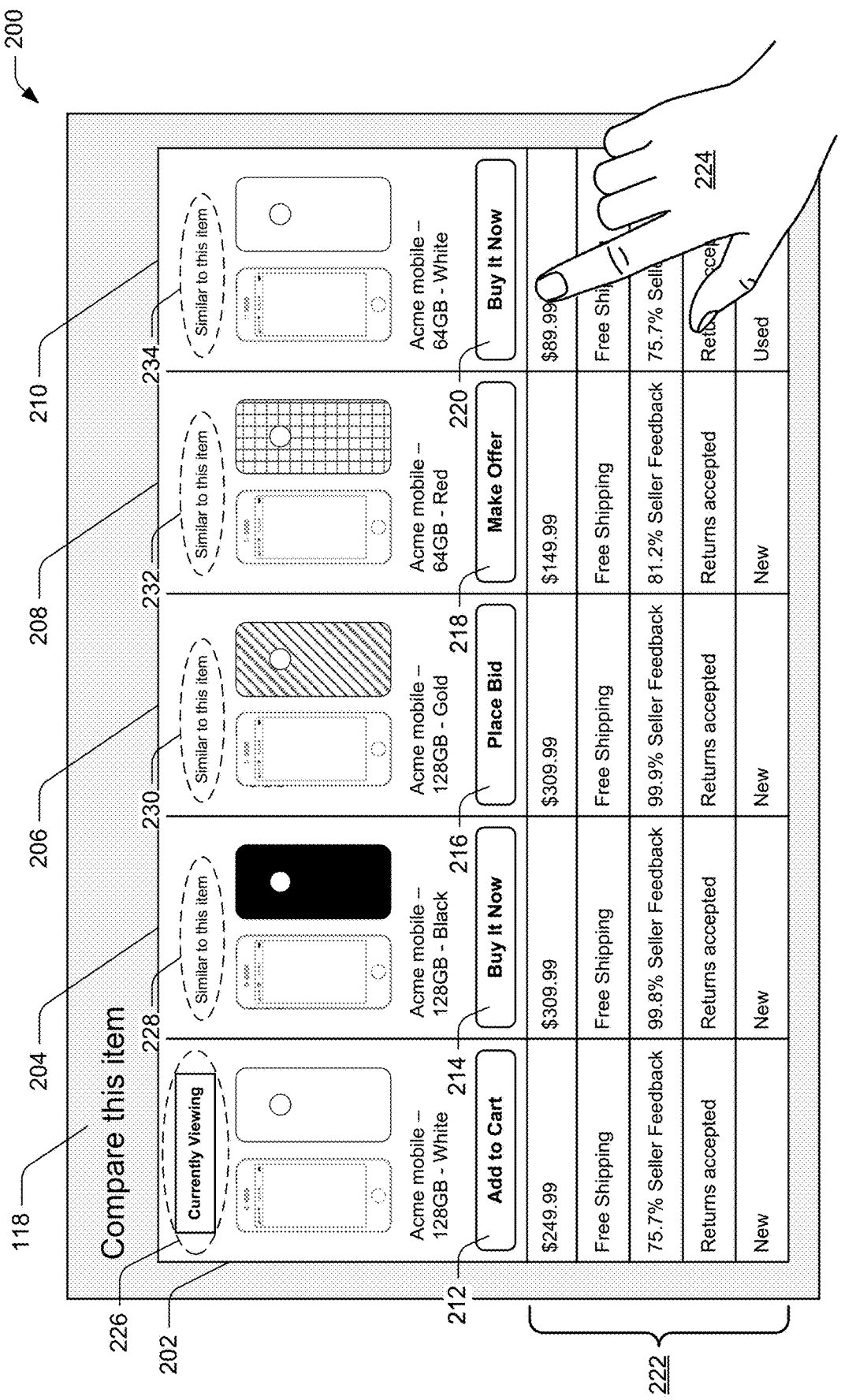
FIG. 2 depicts an example of a user interface displaying a comparison view that includes multiple listings with different action user-interface components.

FIG. 2 depicts an example 200 of a user interface in accordance with the described techniques. In particular, the illustrated example 200 depicts the comparison view 118, which includes multiple listings with different action user-interface components.

In this example 200, the comparison view 118 includes multiple listings, specifically listings 202, 204, 206, 208, 210. The listings 202, 204, 206, 208, 210 each include an action user-interface component 212, 214, 216, 218, 220, respectively. In contrast to conventionally configured comparison views, the listings 202, 204, 206, 208, 210 of the comparison view 118 include different action user-interface components. In the illustrated example 200, for instance, the action user-interface component 212 of the listing 202 is different from the action user-interface component 214 of the listing 204. The action user-interface component 212 of the listing 202 is also different from the action user-interface components 216, 218, 220 of the listings 206, 208, 210, respectively. It is to be appreciated that multiple listings in the comparison view 118 may include a same action user-interface component, such as the listings 204, 210 that include action user-interface components 214, 220, both of which are selectable to initiate the action to "Buy It Now" in relation to their listing. In accordance with the described techniques though, the comparison view 118 includes at least two listings for which the action user-interface components initiate different actions in relation to the respective listings.

In general, these different action user-interface components are user selectable to initiate the different actions in relation to respective listings. For instance, selection of the action user-interface component 212 initiates a different action in relation to the listing 202 (e.g., "Add to Cart") than selection of the action user-interface component 214 initiates in relation to the listing 204 (e.g., "Buy It Now"). With respect to e-commerce, the different actions may correspond to different stages of conversion in relation to a respective listed item. Examples of different e-commerce actions may include "Add to Cart," "Buy It Now," "Place Bid," "Make Offer," "Share," and "Add to Watch List."

Generally speaking, an "Add to Cart" action involves adding an item of a listing to an online shopping cart. A "Buy It Now" action can involve buying an item of a listing at a time that a corresponding component (e.g., a "Buy It Now" button) is substantially selected, e.g., subject to entry of additional information such as confirming credit card information or in some cases no additional information. A "Place Bid" action can involve submitting a bid for an auction to buy an item of a listing. A "Make Offer" action can involve entering an offer to buy an item of a listing. A "Share" action can involve sharing a listing, e.g., via email, text message, other messaging application, one or more social networks, one or more online forums, and so forth. Additionally or alternately, the "Share" action may involve sharing the comparison view 118, such that more than one of the listings is shared (e.g., all of the listings of the comparison view 118). An "Add to Watch List" action can involve adding an item of a listing to a watch list of items. Certainly, these are merely examples, and different e-commerce platforms may operate using different sets of actions that cause transitions to different stages without departing from the spirit or scope of the described techniques.

Regardless, initiation of different actions results in transitions to different stages in relation to a respective listing, such that if a different action were initiated for a same listing, then the listing platform 104 would cause a transition to a different stage in relation to the listing, e.g., by updating a user profile to reflect that a listed item has been added to a cart, added to a wish list, bid on (listing data for an item is also updated to reflect bids on the item), and so forth. This contrasts with the mere inclusion of a different uniform resource locator (URL) for each listing in a comparison view, where selection of a listing's URL simply causes navigation to a dedicated web page for the listing, e.g., a view item page for the particular listed item. In a scenario where the comparison view 118 is used in connection with fantasy sports, the different actions may correspond to different stages of player management in relation to a respective listed player. Examples of different fantasy sports actions may include "Add to Watch List," "Propose Trade," "Pick Up from Waivers," "Add Free Agent," "Bench," "Drop," selection of a starting roster spot, and so forth.

These different actions may be visually indicated in the comparison view 118 in various ways. By way of example, the different user-interface components may include displayed text indicative of a respective action that is performed responsive to selection. In the illustrated example 200, for instance, the action user-interface components 212, 214, 216, 218, 220 are depicted as selectable buttons which each have text indicative of an action taken responsive to selection. Different action user-interface components may have a variety of differing visual characteristics—that enable users to distinguish between the different actions initiated—without departing from the spirit or scope of the described techniques. For instance, action user-interface components for different actions may have different colors, different fonts, different sizes, different shadowing, different three-dimensional (3D) effects (e.g., raised or sunken), different animations (e.g., responsive to hovering or holding a finger/stylus on the display of a component), and so on.

In addition, other user interface components may be output to inform users that the different action-interface components initiate different actions and/or inform them about one or more effects of those actions. For example, the display module 112 may cause pop ups to be displayed that describe the different actions initiated responsive to selection of the action user-interface components 212, 214, 216, 218, 220. Such pop ups may be displayed based on hovering or other similar user interaction proximate the action user-interface components 212, 214, 216, 218, 220. These pop ups may also be displayed a first time or a first few times the comparison view 118 is displayed to a user. Additionally or alternately, an output module of the computing device 102 may cause an audible output describing the different actions initiated responsive to selection of the action user-interface components 212, 214, 216, 218, 220. The described systems may inform users about different actions initiated responsive to selection of different action user-interface components in a variety of ways in accordance with the described techniques.

In addition to these action user-interface components, the comparison view 118 also displays a plurality of attributes 222 for each of the listings 202, 204, 206, 208, 210. Broadly speaking, the attributes 222 included in the comparison view 118 enable the listings 202, 204, 206, 208, 210 to be compared. In one or more scenarios, the attributes 222 included in the comparison view 118 are predetermined for a category of items (e.g., mobile phones). Additionally or alternately, the attributes 222 may be determined based on availability of information for the listings selected for the comparison view 118, such that if all or some threshold of the selected listings have information for a particular attribute (e.g., an image), then that attribute is included in the comparison view. In the illustrated example 200, the attributes 222 include an item image, a listing title (e.g., "Acme mobile—128 GB—White"), a price, shipping information, a seller rating, return information, and item status as new or used. It is to be appreciated that the comparison view 118 may include different attributes without departing from the spirit or scope of the described techniques. For instance, when the comparison view 118 is used in connection with fantasy sports, the attributes 222 may include a player image, current rank, projected rank, injury status, upcoming matchups, news, individual statistics, and so forth.

The illustrated example 200 also includes a hand 224, e.g., of the user 114. The hand 224 represents that the action user-interface components 212, 214, 216, 218, 220 may be selectable based on touch input to initiate a respective action. Although the hand 224 is depicted, the action user-interface components 212, 214, 216, 218, 220 may be selected in a variety of other ways, such as with a stylus, a cursor controlled by a mouse or track ball, gaze-based inputs, gestures, keyboard inputs, voice commands and so forth.

In this example 200, the comparison view 118 also includes comparison explanations 226, 228, 230, 232, 234. In one or more implementations, the comparison explanations 226, 228, 230, 232, 234 explain why a respective listing is included in the comparison view 118. The comparison explanation 226, for instance, explains that the listing 202 is included in the comparison view 118 because it corresponds to an item the user 114 is currently viewing, which is discussed further in relation to FIG. 3. The comparison explanations 228, 230, 232, 234 explain that the respective listings 204, 206, 208, 210 are included in the comparison view 118 because they are similar to the listing 202. Listings may be selected for inclusion in the comparison view 118 for other reasons and thus include different comparison explanations, such as "In Cart," "In Watch List," and so on. The determination of which listings are selected for inclusion as part of the comparison view 118 is discussed in further detail in relation to FIG. 4.

In the illustrated example 200, the comparison view 118 is depicted as a standalone user interface without other user interface components. In one or more implementations, the comparison view 118 may indeed be displayed via the display device 116 without other user interface components, e.g., in a mobile application and responsive to selection of an option, in a view item page, to show the comparison view 118. In other implementations, though, the comparison view 118 may be included as a component of digital content. For instance, the comparison view 118 may be included as a component of a web page having additional digital content. In this context, consider the following discussion of FIG. 3.

Figure 3:
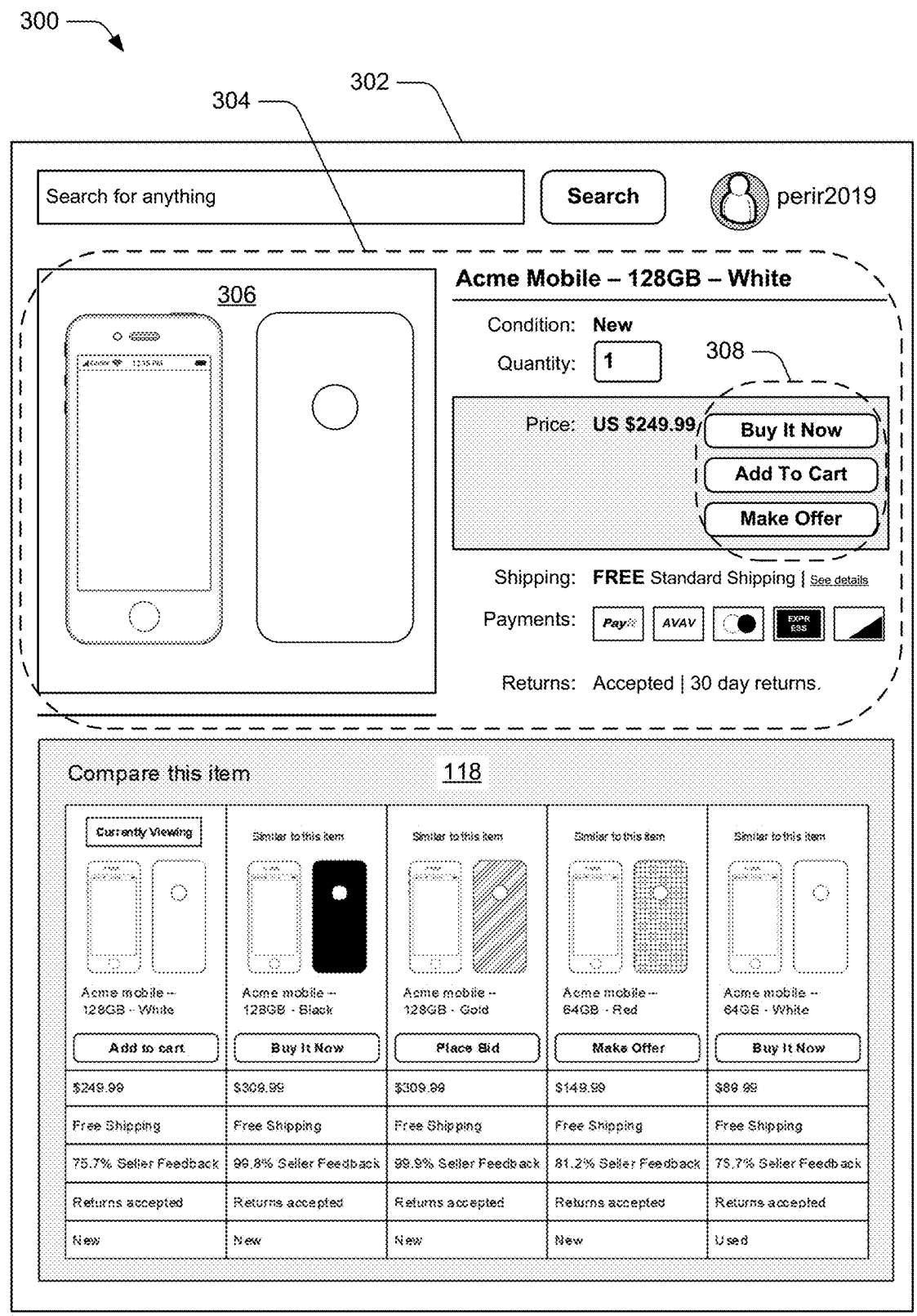
FIG. 3 depicts another example implementation of a user interface in which the comparison view is included as a component of the user interface.

FIG. 3 depicts another example 300 of a user interface in which the comparison view is included as a component of the user interface. In particular, the illustrated example 300 depicts user interface 302, which includes the comparison view 118 and listing specific portion 304.

Here, the listing specific portion 304 corresponds to the listing 202. In contrast to display of the listing 202 in the comparison view 118, the listing specific portion 304 provides more screen space to display information and other digital content (e.g., image 306) of the listing 202. For example, the listing specific portion 304 includes information from the attributes 222 of the listing 202, e.g., listing title, price, shipping information, return information, and item status as new or used. As included in the listing specific portion 304, this information may include a greater amount of information than in the comparison view 118. Consider the shipping information attribute 222, for example. In the comparison view 118, the listing 202 merely includes the indication that shipping is free. The listing specific portion 304 includes additional, clarifying information relative to the comparison view 118. In particular, the listing specific portion 304 indicates that "Standard" shipping is free and includes a hyperlink to see more shipping details. The listing specific portion 304 also includes additional graphics to enhance the presentation of the listing 202 in the listing specific portion 304, e.g., graphics of acceptable forms of payment.

Notably, the listing specific portion 304 also includes display of multiple, different action user-interface components 308. These multiple, different action user-interface components 308 are selectable to initiate different actions in relation to the listing 202. These multiple, different action user-interface components 308 may correspond to the actions that are allowed in relation to the listing 202, e.g., all of the allowed actions. Some actions used by the listing platform 104 may not be allowed for some listings, such as when a listing user selects a subset of the platform's actions to expose in connection with a respective listing or when only a subset of the platform's listings are applicable to a manner in which the listing user selects to sell a listed item (e.g., auction versus fixed price). The inclusion of these multiple, different action user-interface components 308 in the listing specific portion 304 further represents that the single action user-interface component 212 is included in the comparison view 118 based on a determination of a single action from multiple actions available in relation to the listing 202.

In this context, it is also noted that the comparison view 118 displays only a single action user-interface component in each of the listings 202, 204, 206, 208, 210. Moreover, each of the action user-interface components 212, 214, 216, 218, 220 is positioned at a same relative location within a respective listing. In the illustrated examples, the listings are arranged horizontally in the comparison view 118, one listing to another, such that the action user-interface components are positioned at a same vertical location within the respective listing. In a scenario where listings are arranged vertically in the comparison view 118, one listing to another, the action user-interface components may be positioned at a same horizontal location within the respective listing. In one or more implementations, listings in the comparison view 118 may each include display of multiple action user-interface components. By way of example, each listing may include two selectable buttons. In such scenarios, the action user-interface components displayed in at least one of the listings are different from the action user-interface components displayed in at least one other listing in the comparison view 118. For instance, a first listing may include a display of an "Add to Cart" button and a "Buy It Now" button, and a second listing may include a display of an "Add to Cart" button and a "Place Bid" button, but not the "Buy It Now" button. In other words, the listings may display different combinations of multiple action user-interface components. In the context of determining which action of the listing platform 104's available actions to expose via an action user-interface component in a listing of the comparison view 118, consider the following discussion of FIG. 4.

Figure 4:
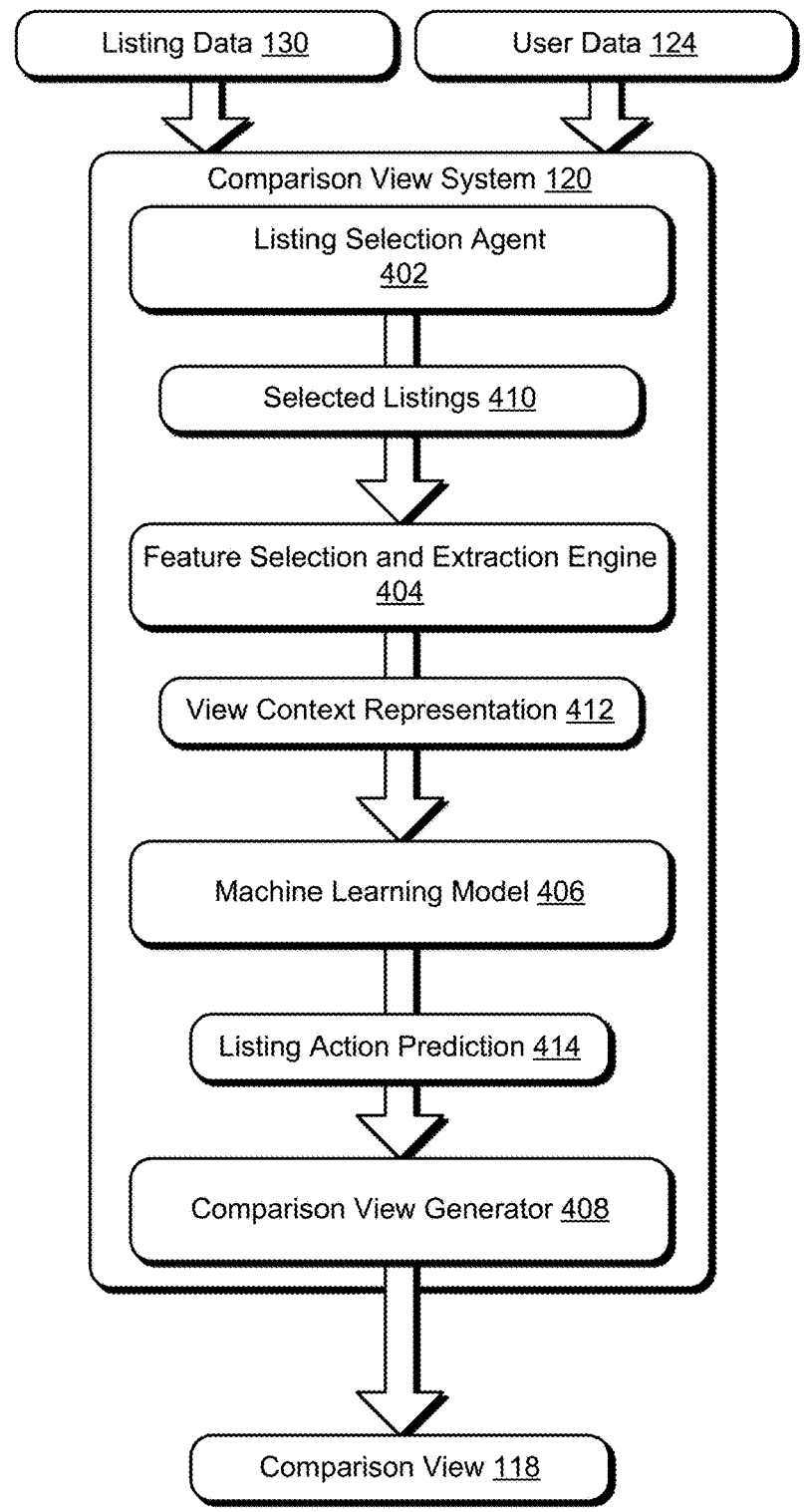
FIG. 4 depicts an example implementation in which a comparison view system of FIG. 1 generates a comparison view with different action user-interface components.

FIG. 4 depicts an example 400 of an implementation in which the comparison view system of FIG. 1 generates a comparison view with different action user-interface components. From FIG. 1, the illustrated example 400 includes the comparison view system 120.

In this example 400, the comparison view system 120 is depicted obtaining the listing data 130 and the user data 124 as input, e.g., from the storage 132, 126. The comparison view system 120 is also depicted outputting the comparison view 118. The comparison view system 120 may output the comparison view 118 by communicating it over the network 108 to the computing device 102, enabling the display module 112 to cause display of the comparison view 118 via the display device 116. In at least some implementations, the comparison view system 120 may communicate information, corresponding to the comparison view 118, which enables the display module 112 to render the comparison view 118 for display via the display device 116.

In this example 400, the comparison view system 120 is illustrated as including listing selection agent 402, feature selection and extraction engine 404, machine learning model 406, and comparison view generator 408. These components are configured to perform various actions and generate various data as discussed above and below that is used to produce the comparison view 118. It is to be appreciated that although the comparison view system 120 is illustrated with these components, the comparison view system 120 may include more, fewer, and/or different components to produce the comparison view 118 without departing from the spirit or scope of the described techniques.

Initially, the listing selection agent 402 selects a plurality of listings to include in the comparison view 118. Selected listings 410 represent the listings selected by the listing selection agent 402 from the listings 134 listed by the listing platform 104 and for inclusion in the comparison view 118. The listing selection agent 402 may select the selected listings 410 in various ways. For example, the listing selection agent 402 may select similar listings for inclusion in the comparison view 118, such as when the comparison view 118 is displayed as a component of a user interface (e.g., web page) for a particular listing and the similar listings are selected as being similar to the particular listing. In addition or alternately, the listing selection agent 402 may select the selected listings 410 based on inclusion in an existing list, such as the user 114's watch list (or wish list), based on having been added to the user 114's online shopping cart, and so forth. In the context of e-commerce, the listing selection agent 402 may select the selected listings 410 based on a merchandising algorithm, such as a known merchandising algorithm used to select multiple listings for inclusion in comparison views.

The feature selection and extraction engine 404 identifies aspects of a context in which the comparison view 118 is displayed. The feature selection and extraction engine 404 identifies these aspects to quantify them for input to the machine learning model 406. The feature selection and extraction engine 404 also extracts data describing the identified aspects from the listing data 130 and the user data 124. The feature selection and extraction engine 404 packages this extracted data as view context representation 412. The feature selection and extraction engine 404 may generate a view context representation 412 for each of the selected listings 410—one view context representation for one selected listing.

Broadly speaking, the view context representation 412 describes the context in which the comparison view 118 is displayed. In one or more implementations, the feature selection and extraction engine 404 generates the view context representation 412 as a feature vector, which includes a feature for each of the identified aspects. In such implementations, the feature selection and extraction engine 404 converts the data extracted for an aspect into a numerical representation of the aspect, i.e., a value indicative of the aspect. This conversion can be referred to as "quantification." The feature selection and extraction engine 404 then sets a value for the aspect's corresponding feature to the numerical representation of the aspect. The feature selection and extraction engine 404 sets values for each feature of the feature vector to the numerical representation derived for the corresponding aspect.

In one or more implementations, the feature selection and extraction engine 404 extracts from the listing data 130 and the user data 124 data describing context aspects including: the user 114's most used action user-interface component (e.g., most used button) leading to conversion in connection with previous listings (e.g., previously purchased items); a category associated with a listing for which the action is being predicted; price range or cost associated with the listing; number of times the listing is watched, added to cart, and/or viewed by the other users 122. In such implementations, the feature selection and extraction engine 404 thus derives a numerical representation of each of these aspects from the listing data 130 and the user data 124 and incorporates them as features into a feature vector implementing the view context representation 412.

With respect to the example implementation aspects discussed above, the category of a listing affects the context in which the comparison view 118 is displayed because users interact differently with listings in different categories. Accordingly, the category associated with a listing may affect how the user 114 behaves in relation to the listing. By way of example, users interact with listings for electronics (e.g. mobile devices) differently from listings for collectibles (e.g., comic books) and listings for auto parts (e.g., oil filters).

In a scenario where the listing platform 104 corresponds to an e-commerce platform, examples of categories that can be associated with a listing may include antiques; art; baby; books; business & industrial; cameras & photo; cell phones & accessories; clothing, shoes & accessories; coins & paper money; collectibles; computers/tablets & networking; consumer electronics; crafts; dolls & bears; DVDs & movies; automobile & motors; entertainment memorabilia; gift cards & coupons; health & beauty; home & garden; jewelry & watches; music; musical instruments & gear; pet supplies; pottery & glass; real estate; specialty services; sports memorabilia, cards & fan shop; stamps; tickets & experiences; toys & hobbies; travel; video game consoles; and so on. E-commerce platforms may use different categories without departing from the spirit or scope of the described techniques. Additionally, other types of listing platforms 104—such as fantasy sports platforms, platforms for financial instrument trading, social networking platforms, and online dating platforms—may have a variety of different categories without departing from the spirit or scope of the described techniques.

In a similar manner as a listing's category, a price or other cost associated with a listing affects the context in which the comparison view 118 is displayed because users interact differently with listings in different price ranges or having otherwise different costs. With respect to prices, for instance, users generally interact with listings that list an item for $100.00 USD or less differently from listings that list an item at more than $1,000,000 USD. For example, users may more often select "Buy It Now" or "Add to Cart" in connection with listings that list items for $100.00 USD or less and may more often select "Add to Wish List" for listings that list an item for more than $1,000,000 USD. To the extent that price affects the action user-interface components that users select to lead to conversions, the price aspect may be captured in the view context representation 412, e.g., as a feature of a feature vector. In the fantasy sports scenario, the price aspect may correspond to other costs to a user, such as loss of waiver priority or loss of virtual currency. Although the above-noted aspects describing the comparison view 118's context are discussed, it is to be appreciated that the view context representation 412 may be configured to represent different aspects and combinations of aspects without departing from the spirit or scope of the described techniques.

Once generated, the comparison view system 120 provides the view context representation 412 (e.g., a feature vector) as input to the machine learning model 406. Based on the view context representation 412, the machine learning model 406 generates listing action prediction 414. To the extent that a view context representation 412 is provided as input for each of the selected listings 410, the machine learning model 406 generates a listing action prediction 414 for each of the selected listings 410. The listing action prediction 414 indicates which available action is predicted most likely to cause conversion in relation to the respective selected listing 410. In one or more implementations, the machine learning model 406 generates the listing action prediction 414 as a feature vector, where each feature corresponds to an available action for a selected listing. In such implementations, the value of each feature corresponds to a probability that the user 114 will choose an interface component of the respective action.

The action determined for a selected listing 410 may be determined, in part, by processing the listing action prediction 414, configured as a feature vector, according to a probability density function. This processing may be carried out by the comparison view system 120 or one of its components, e.g., the comparison view generator 408. By processing the feature vector with this probability density function, the comparison view system 120 determines which action to associate with the selected listing 410 in the comparison view 118. The comparison view generator 408 generates the comparison view 118 to include in the selected listing 410 an action user-interface component that corresponds to the determined action. Although processing with the probability function may often yield determination of a most probable action given the discussed feature vector, this processing does not always yield determination of the most probable action.

In one or more implementations, the machine learning model 406 is a reinforcement learning model. Initially, this reinforcement learning model may be configured to generate the listing action prediction 414 according to an initial, hardcoded policy, such as a policy that instructs the model to determine the action "Buy It Now" for a first listing in the comparison view 118, determine the action "Make Offer" for a second listing in the comparison view 118, and so on. Over time, the machine learning model 406 refines this policy. The policy is refined based on the actions determined for the selected listings 410, monitored user interactions with action user-interface components displayed based on the determined actions over a time period subsequent to the display (e.g., 24 hours), and by negatively or positively reinforcing the reinforcement learning model depending on the monitored user interactions over this time period.

If the user 114 selects an action user-interface component within the subsequent time period, for example, then the reinforcement learning model is positively reinforced for predicting the respective action, e.g., the model is positively reinforced by associating the prediction with a positive reward of +1. On the other hand, if the user 114 does not select the action user-interface component within the subsequent time period, then the reinforcement learning model is negatively reinforced (or "punished") for predicting the respective action, e.g., the model is negatively reinforced by associating the prediction with a negative reward of −1. Based on these rewards, the comparison view system 120 adjusts internal weights of the reinforcement learning model (the machine learning model 406). By adjusting these internal weights, the policy embodied by the machine learning model 406 is updated. These adjustments are made to optimize the model for some pre-selected goal, such as to maximize a number of users that make a purchase via the listing platform 104 or maximize a purchase volume across all users of the listing platform 104. The model may also be optimized based on a weighted combination of goals, such as a weighted combination of number of users making purchases and purchase volume. Through reinforcement of its decisions (e.g., by association of positive or negative rewards with predictions), the reinforcement learning model learns what actions to predict based on previous predictions made for the user 114 and for the other users 122.

By configuring the machine learning model 406 as a reinforcement learning model, the machine learning model 406 is able to learn user behavior over time and is adjusted to account for changes in user behavior rather than treating users as static. Further, the reinforcement learning model is provided input for each prediction describing the context of displaying the comparison view 118 in real-time and at a particular time the comparison view 118 is requested for display—this accounts for changes in behaviors of individual users as well as of groups of users (e.g., due to market conditions). The reinforcement learning model may also be updated online (e.g., in real-time as feedback is received), or may be updated in batch (e.g., once a day based on the feedback received over the day).

When implemented as a reinforcement learning model, the machine learning model 406 may generate listing action predictions 414 for the same user 114 that are different at a first time than at a second time for the same selected listings 410. The machine learning model 406 may also generate listing action predictions 414 at a same time for different users that are different for the same selected listings 410. This is due to differing contexts for a given user at different times (e.g., the given user may or may not have interacted with components causing context to change at a subsequent time) and differing contexts for different users at a same time. Through implementation as a reinforcement learning model, the machine learning model 406 contrasts with classifiers and neural networks because the machine learning model 406 learns a policy for predicting actions during actual deployment rather than through a training process using one or more training data sets.

Figure 5:
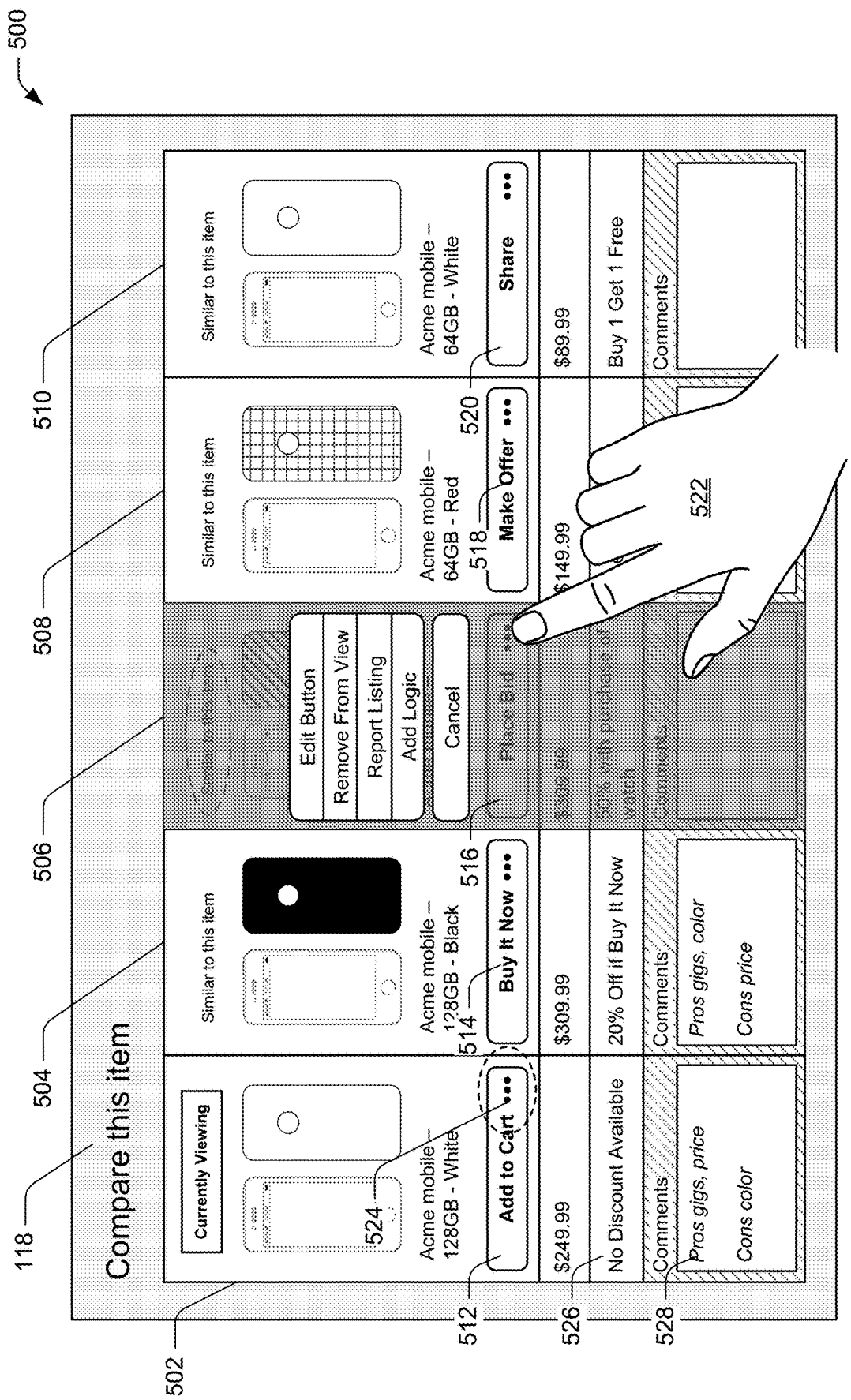
FIG. 5 depicts a different example of a user interface displaying the comparison view having multiple listings with different action user-interface components.

FIG. 5 depicts a different example 500 of a user interface displaying the comparison view and having multiple listings with different action user-interface components. The illustrated example 500 depicts a different configuration of the comparison view 118 than FIGS. 2 and 3, but also includes multiple listings with different action user-interface components.

In this example 500, the comparison view includes listings 502, 504, 506, 508, 510, which each include an action user-interface component 512, 514, 516, 518, 520, respectively. Here, the action user-interface components 512, 514, 516, 518, 520 are selectable to initiate the actions "Add to Cart," "Buy It Now," "Place Bid," "Make Offer," and "Share," respectively, and which are discussed in more detail above. As also noted above, though, user-interface components of the comparison view 118 may be selectable to initiate different actions without departing from the spirit or scope of the described techniques.

In contrast to the comparison view 118 as illustrated in FIGS. 2 and 3, the comparison view 118 as illustrated in FIG. 5 has some different components with which a user—represented by hand 522—can interact and provide different functionality and information from the previously discussed components. It is to be noted that various combinations of the components discussed in relation to FIG. 5 as well as in relation to FIGS. 2 and 3 may be included in the comparison view 118 in one or more implementations. It is also to be appreciated that some of the components discussed in relation to these figures may not be included one or more implementations.

In any case, the different components depicted in FIG. 5 include, for each listing, an editing option 524 associated with the action user-interface components, a discount attribute 526, and a comments field 528. In one or more implementations, the editing option 524 is selectable to edit aspects of a respective listing or action user-interface component. By way of example, selection of the editing option 524 can surface one or more further options which enable the user to change an action initiated responsive to selection of the respective action user-interface component, e.g., change an action initiated from "Add to Cart" to "Share". Responsive to interaction with these options, the comparison view system 120 can also change a visual appearance of the respective action user-interface component to indicate the action initiated, such as by changing text displayed on a corresponding button or any of the various other visual characteristics discussed above.

As noted above, a tracking service tracks interactions of users with interfaces of the listing platform 104. This includes tracking interactions of users with the editing option 524 to change an action initiated due to selection of an action user-interface component, e.g., interactions to change an "Add to Watch List" button to a "Buy It Now" button. To this end, the user data 124, namely, the tracked interactions 128 that are provided as input to the comparison view system 120, can be used to further refine the policy implemented by the machine learning model 406. For instance, user interaction to change an action user-interface element may be captured via the view context representation 414, e.g., as one or more features of a vector representation.

Additionally, the machine learning model 406 may be positively or negatively reinforced as discussed above based on this interaction, such as by rewarding the machine learning model 406 negatively for predicting a first action rather than a second action to which the user changed an action user-interface component. Indeed, these interactions of users to change the action user-interface components may be captured and accounted for through reinforcement (e.g., rewards) to the machine learning model 406. This may be handled in scenarios where the machine learning model 406 is configured as a reinforcement learning model, such as by using a process as discussed in more detail above in relation to the machine learning model 406 being configured as a reinforcement learning model.

It is to be appreciated though that interaction of a user to change an action user-interface component may be captured in connection with other machine learning models, and also used to inform subsequent predictions regarding which actions to initiate for each action user-interface component of the comparison view 118, in various ways without departing from the spirit or scope of the described techniques.

In addition to enabling a user to change an action initiated, selection of the editing option 524 can also cause options to be surfaced for removing a listing from the comparison view 118, reporting a listing (e.g., for including information or listing an item a user believes violates one or more policies of the listing platform 104), adding logic in relation to a respective listing, and so forth. The term "adding logic" refers to the ability of the user to specify how the listing platform 104 is to process a given listing based on occurrence of one or more conditions. This "logic" may be specified in the form of "if/then" conditions, for example. Consider an example in which a user places a bid for an auction of a first listing of the listing platform. In this example, the "Add Logic" option can be selected to enable the user to specify that "if" the user does not win the auction for the first listing with the placed bid, "then" the listing platform 104 is simply to buy a second listing at a time the auction for the first listing is not won, e.g., equivalent to selection of "Buy It Now" in relation to the second listing. In the context of fantasy sports, for instance, this can enable a user to specify logic to pick up a secondary player as a free agent if a primary player does not clear the league's waiver wire. In one or more implementations, the listing platform 104 may enable a user to specify multiple if/then statements and/or other logic for processing listings, e.g., if/else, for each, nested logic, and so forth.

In the context of the illustrated example 500, it represents a scenario where the hand 522 of the user selects the editing option 524 of the listing 506. Responsive to this selection, various editing options are displayed in connection with the listing. Specifically, and as discussed above, the options of "Edit Button," "Remove From View," "Report Listing," "Add Logic," and "Cancel" are depicted. It is to be appreciated that selection of the editing option 524 may surface different options without departing from the spirit or scope of the described techniques and also that the editing option 524 may be configured differently (e.g., have a different appearance or be positioned differently within a listing) in implementations.

The discount attribute 526 indicates discounts available in relation to a respective listing. For example, the discount attribute 526 can indicate whether any discounts are available in relation to the respective listing or not. If any discount is available, the discount attribute 526 may provide information about one or more of the discounts. By way of example, the discount attribute 526 may specify an amount off of a respective listing, an amount off if a particular action is initiated by a user in relation to the respective listing (e.g., "Buy It Now," "Share," etc.), an amount off if a user purchases a supplemental item along with an item listed in a respective listing, a subscription discount, a buy one get one free discount, and so forth. The discount attribute 526 may be used to specify a variety of discounts in relation to a listing without departing from the spirit or scope of the described techniques.

The comments field 528 enables a user to specify information in relation to a respective listing and also displays that information after it is input. For instance, the comments field 528 enables a user to input lists of pros and cons in relation to listings of the comparison view 118. The comments field 528 may persist this information across multiple sessions of interaction with the listing platform 104, cause the information to be saved to a user profile, cause the information to be saved using a cookie, or maintained simply while viewing the comparison view 118 and then deleted or otherwise not maintained. The comments field 528 enables a user to specify a variety of information (e.g., by typing or voice input) for display in the field, and also enables a user to edit the specified information in relation to a given listing without departing from the spirit or scope of the described techniques.

Having discussed example details of the techniques for different action user-interface components in a comparison view, consider now some example procedures to illustrate additional aspects of the techniques.

Example Procedures

This section describes example procedures for different action user-interface components in a comparison view in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the computing device 102 of FIG. 1 having a display module 112 or the listing platform 104 having the comparison view system 120.

Figure 6:
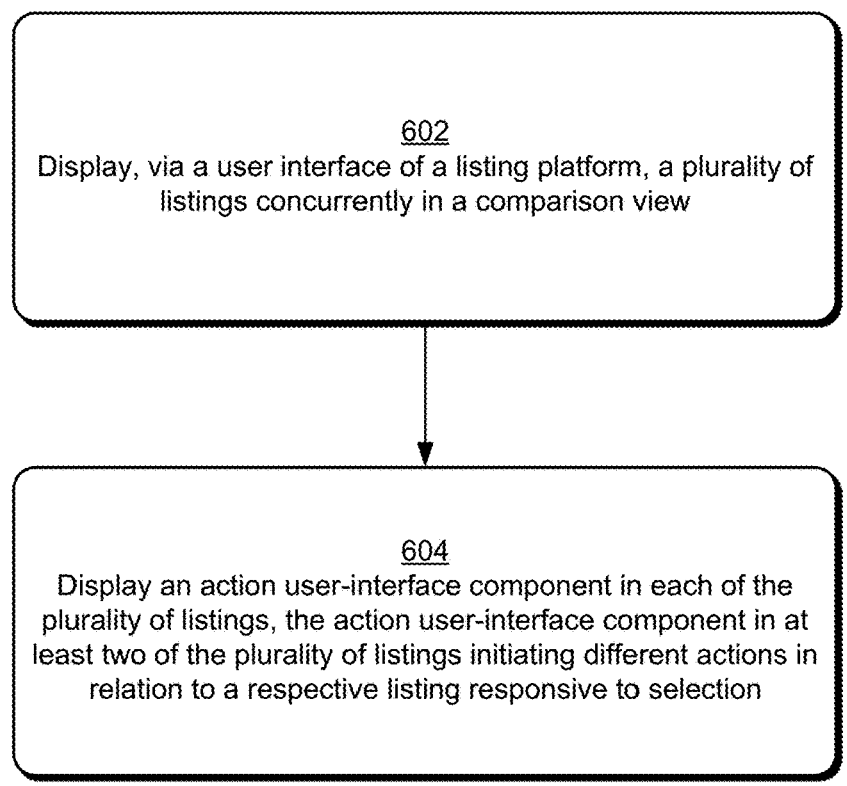
FIG. 6 depicts a procedure in an example implementation in which a comparison view is displayed with different action user-interface components.

FIG. 6 depicts an example procedure 600 in which in which a comparison view is displayed with different action user-interface components.

A plurality of listings is displayed concurrently in a comparison view via a user interface of a listing platform (block 602). By way of example, the display module 112 causes display of the comparison view 118 via the display device 116 of the computing device 102. As discussed above and below, the comparison view 118 includes multiple listings, such as the listings 202, 204, 206, 208, 210 depicted in FIG. 2.

An action user-interface component is displayed in each of the plurality of listings (block 604). In accordance with the principle discussed herein, the action user-interface components displayed in at least two of the plurality of listings, responsive to selection, initiate different actions in relation to a respective listing. By way of example, the display module 112 causes display of the action user-interface components 212, 214, 216, 218, 220 in the listings 202, 204, 206, 208, 210, respectively. As discussed in relation to FIG. 2, at least two of these action user-interface components 212, 214, 216, 218, 220 initiate different actions responsive to selection and in relation to their respective listing. Selection of the action user-interface component 212, for instance, initiates an action ("Add to Cart") in relation to the listing 202 that is different from an action ("Buy It Now) initiated in relation to the listing 204 responsive to selection of the action user-interface component 214.

Figure 7:
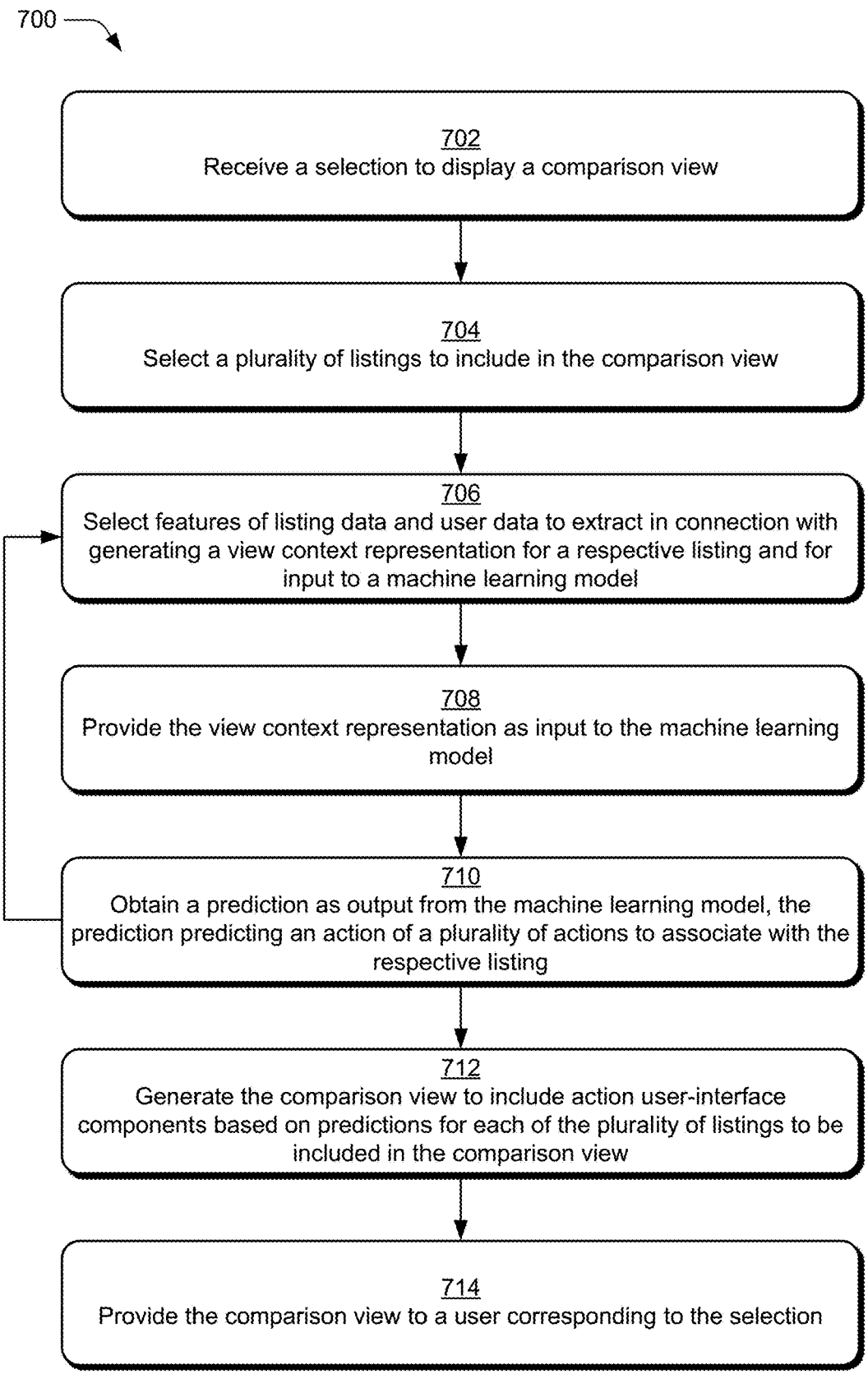
FIG. 7 depicts a procedure in an example implementation in which a comparison view is generated, based on user data and using machine learning, to include different action user-interface components.

FIG. 7 depicts an example procedure 700 in which a comparison view is generated, based on user data and using machine learning, to include different action user-interface components.

A selection to display a comparison view is received (block 702). By way of example, the computing device 102 receives a selection to navigate to the user interface 302 having the listing specific portion 304 and the comparison view 118. This selection may correspond to selection of a URL to navigate to a web page configured as the user interface 302, a search result provided responsive to a search query, and so forth.

A plurality of listings is selected for inclusion in the comparison view (block 704). By way of example, the listing selection agent 402 selects the selected listings 410 from the available listings 134 listed by the listing platform 104. For instance, the listing selection agent 402 selects the listings according to one or more merchandising algorithms.

The following steps of blocks 706-710 are repeated for each individual listing selected for inclusion in the comparison view 118. By way of example, if there are three listings selected for inclusion in the comparison view 118, then the blocks 706-708 are repeated three times, once in relation to each of these listings. Features of listing data and user data are selected for extraction in connection with generating a view context representation for a respective listing and as input to a machine learning model (block 706). By way of example, the feature selection and extraction engine 404 selects aspects of a context, in which the comparison view 118 is displayed, to quantify for input to the machine learning model 406. In this example, the feature selection and extraction engine 404 extracts data corresponding to the identified features from the listing data 130 and the user data 124. The feature selection and extraction engine 404 generates the view context representation 412 to persist the extracted data. When the view context representation 412 is configured as a feature vector, for instance, the extracted data is persisted as numerical representations in features of this feature vector.

The view context representation is provided as input to the machine learning model (block 708). By way of example, the comparison view system 120 provides the view context representation 412 as input to the machine learning model 406. A prediction is obtained as output from the machine learning model (block 710). In accordance with the principles discussed herein, the prediction predicts an action of a plurality of actions to associate with the respective listing. By way of example, the comparison view system 120 obtains the listing action prediction 414 as output from the machine learning model 406. As discussed above, the listing action prediction 414 is usable—with application of a probability density function—to predict an action of the listing platform 104's actions to associate with the respective selected listing 410.

The comparison view is generated to include action user-interface components based on predictions for each of the plurality of listings that is to be included in the comparison view (block 712). By way of example, the comparison view generator 408 generates the comparison view 118 to include action user-interface components based on the predictions obtained at block 710 for all of the selected listings 410.

The comparison view is provided to a user corresponding to the selection (block 714). By way of example, the comparison view 118 is communicated over the network to the computing device 102 and the display module 112 causes display of the comparison view 118 via the display device 116. Although the comparison view system 120 is depicted as being separate from the computing device 102, the comparison view system 120 may be included in the computing device 102 in one or more implementations, e.g., as part of one of the applications 110. In such scenarios, the comparison view 118 may be retrieved by the display module 112 from memory (not shown) and displayed via the display device 116.

Having described example procedures in accordance with one or more implementations, consider now an example system and device that can be utilized to implement the various techniques described herein.

Example System and Device

Figure 8:
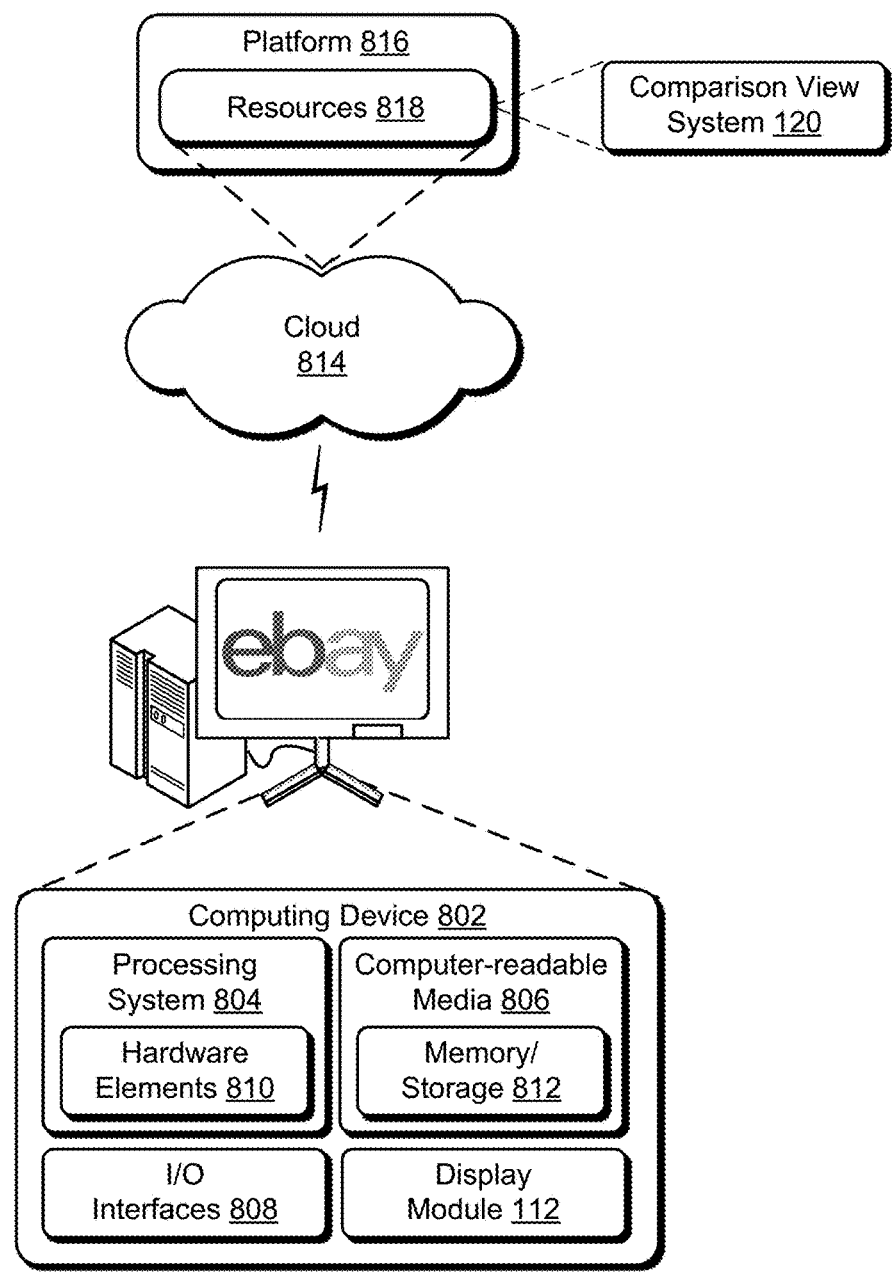
FIG. 8 illustrates an example system including various components of an example device that can be implemented as any type of computing device as described and/or utilized with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the display module 112 and the comparison view system 120. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented at least partially in hardware of a computing device, the method comprising:
    displaying, via a user interface of a listing platform, an initial set of action user-interface components that are selectable to initiate actions for an initial set of listings, the actions determined for the initial set of listings according to an initial policy for determining the actions;
    refining the policy, using a machine learning model, based on user interactions with the initial set of action user-interface components monitored over a time period;
    displaying, via the user interface of the listing platform, a plurality of listings concurrently in a comparison view, the plurality of listings including at least a first listing representing a first item and a second listing representing a second item;
    determining which action of a plurality of actions to associate with each listing of the plurality of listings using the refined policy; and
    displaying, in each listing of the plurality of listings in the comparison view and concurrently, only one respective action user-interface component including:
        a first respective action user-interface component selectable via the user interface to initiate a first action with respect to the first item; and
        a second respective action user-interface component selectable via the user interface to initiate a second action with respect to the second item, the second action being different from the first action.

2. The method as described in claim 1, wherein the one respective action user-interface component is displayed in a same relative position in each listing of the plurality of listings.

3. The method as described in claim 1, wherein selection of the first respective action user-interface component displayed in the first listing initiates one of:
    buying the first item at a time of the selection;
    adding the first item to a cart;
    submitting a bid for an auction of the first item;
    entering an offer to buy the first item;
    sharing the first item; or
    adding the first item to a watch list of items.

4. The method as described in claim 3, wherein selection of the second action user-interface component displayed in the second listing initiates a different one of:
    buying the second item at a time of the selection;
    adding the second item to the cart;
    submitting a bid for an auction of the second item;
    entering an offer to buy the second item;
    sharing the second item; or
    adding the second item to the watch list of items.

5. The method as described in claim 1, wherein each listing of the plurality of listings includes a set of attributes for comparison to the set of attributes of each other listing.

6. The method as described in claim 1, wherein the first respective action user-interface component is displayed in a first column of the comparison view that corresponds to the first listing and the second respective action user-interface component is displayed in a second column of the comparison view that corresponds to the second listing.

7. The method as described in claim 1, wherein the first respective action user-interface component includes text indicative of the first action and the second action user-interface component includes different text indicative of the second action.

8. The method as described in claim 1, wherein refining the policy includes positively reinforcing the policy based on user input being received during the time period to select an action user-interface component of the initial set of action user-interface components.

9. The method as described in claim 1, wherein refining the policy includes negatively reinforcing the policy based on user input not being received during the time period to select an action user-interface component of the initial set of action user-interface components.

10. The method as described in claim 1, further comprising:
receiving user input to change the one respective action user-interface component displayed in at least one listing of the plurality of listings; and
further refining the policy based on the user input.

11. A system comprising:
a display device; and
a display module implemented at least partially in software of a computing device and communicably coupled to the display device to:
cause display, via the display device, of an initial set of action user-interface components that are selectable to initiate actions for an initial set of listings, the actions determined for the initial set of listings according to an initial policy for determining the actions, the policy being refined by a machine learning model based on user interactions with the initial set of action user-interface components monitored over a time period;
cause display, via the display device, of a plurality of listings concurrently in a comparison view, the plurality of listings including at least a first listing that represents a first item and a second listing that represents a second item, each listing of the plurality of listings being associated with an action of a plurality of actions, the action determined using the refined policy; and
cause display, via the display device and in each listing of the plurality of listings concurrently, of only one respective action user-interface component including:
a first respective action user-interface component selectable via a user interface of a listing platform to initiate a first action with respect to the first item; and
a second respective action user-interface component selectable via the user interface to initiate a second action with respect to the second item, the second action being different from the first action.

12. The system as described in claim 11, wherein the first respective action user-interface component displayed in the first listing has at least one different visual characteristic from the second respective action user-interface component displayed in the second listing.

13. The system as described in claim 12, wherein the at least one different visual characteristic is text, indicative of an action initiated responsive to selection of the one respective action user-interface component.

14. The system as described in claim 12, wherein the at least one different visual characteristic is a color of the one respective action user-interface component.

15. The system as described in claim 11, wherein the one respective action user-interface component is configured as a selectable button in each listing of the plurality of listings.

16. The system as described in claim 11, wherein the one respective action user-interface component is displayed in a same relative position in each listing of the plurality of listings.

17. The system as described in claim 11, wherein each listing of the plurality of listings includes a set of attributes for comparison to the set of attributes of each other listing.

18. A method implemented at least partially in hardware of a computing device, the method comprising:
displaying, via a user interface of a listing platform, an initial set of action user-interface components that are selectable to initiate actions for an initial set of listings, the actions determined for the initial set of listings according to an initial policy for determining the actions, the policy being refined by a machine learning model based on user interactions with the initial set of action user-interface components monitored over a time period;
displaying, via the user interface of the listing platform, a plurality of listings concurrently in a comparison view, the plurality of listings including at least a first listing representing a first item and a second listing representing a second item;
determining which action of a plurality of actions, available for use in connection with the listing platform, to associate with each listing of the plurality of listings using the refined policy; and
displaying, at a same relative position within each listing of the plurality of listings in the comparison view and concurrently, only one respective action user-interface component including:
a first respective action user-interface component selectable via the user interface to initiate a first action with respect to the first item; and
a second respective action user-interface component selectable via the user interface to initiate a second action with respect to the second item, the second action being different from the first action.

19. The method as described in claim 18, wherein the machine learning model is a reinforcement model that determines which action of the plurality of actions to associate with each listing of the plurality of listings based on at least one of:
a most used action user-interface component that has led to conversion previously with listings of the listing platform;
a category associated with a listing;
a price range associated with the listing;
a number of times the listing is added to a watch list by users of the listing platform;
a number of times the listing is added to an online shopping cart by the users of the listing platform; or
a number of times the listing is viewed by the users of the listing platform.

20. The method as described in claim 18, further comprising determining which listings of the listing platform to include in the plurality of listings based on at least one of inclusion on a list of listings or similarity with a particular listing of the plurality of listings.

* * * * *